(12) United States Patent
Cheng

(10) Patent No.: US 7,886,625 B2
(45) Date of Patent: Feb. 15, 2011

(54) ACTUATOR WITH SELF-LOCKING ASSIST DEVICE

(75) Inventor: Fu-Yuan Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 286 days.

(21) Appl. No.: 12/271,904

(22) Filed: Nov. 16, 2008

(65) Prior Publication Data

US 2010/0122594 A1 May 20, 2010

(51) Int. Cl.
*F16H 3/06* (2006.01)
*F16H 27/02* (2006.01)
*F16H 29/02* (2006.01)
*F16H 29/20* (2006.01)

(52) U.S. Cl. ............ 74/89.37; 74/89.23; 74/89.39
(58) Field of Classification Search .......... 74/89.23, 74/89.26, 89.37, 89.39, 89.42, 409, 425, 74/568 R; 384/245, 610
See application file for complete search history.

(56) References Cited

U.S. PATENT DOCUMENTS

| 931,069 | A | * | 8/1909 | Larrabee | 384/610 |
| 6,564,666 | B1 | * | 5/2003 | Marcel | 74/425 |
| 6,951,424 | B2 | * | 10/2005 | Mutai et al. | 384/610 |
| 2005/0241420 | A1 | * | 11/2005 | Oberle et al. | 74/89.42 |
| 2008/0130310 | A1 | * | 6/2008 | Pfister | 362/528 |

* cited by examiner

*Primary Examiner*—Justin Krause
(74) *Attorney, Agent, or Firm*—Banger Shia

(57) ABSTRACT

An actuator with self-locking assist device comprises an actuator and a self-locking assist device, wherein the self-locking assist device is disposed at one end of the actuator, and the friction force between the self-locking assist device and the actuator is used to improve the self-locking capability of the actuator, thus preventing the uncontrollable movement of the actuator caused by the influence of the load carried.

4 Claims, 5 Drawing Sheets

ABSTRACT

ACTUATOR WITH SELF-LOCKING ASSIST DEVICE

BACKGROUND OF THE INVENTION

1. Field of the Invention

The present invention relates to an actuator, and more particularly to an actuator with self-locking assist device.

2. Description of the Prior Art

Actuator is usually used in various kinds of equipments (such as ventilator, automatic door, cupboard, satellite antenna hoisting device, elevating wheelchair, height-adjustable hospital bed, drawing table, massage chair, transportation equipment, height-adjustable computer desk or rehabilitation equipment) to achieve automatic operation.

As shown in FIG. 1, an actuator 10 comprises a first pipe 11 and a second pipe 12 inserted in the first pipe 11. In the first pipe 11 is axially pivoted a screw 13 on which is axially mounted a gear 131. Through the gear 131 the screw 13 is connected to and rotated by a power source. The second pipe 12 has one end positioned at one end of a nut 132 and is to be pushed to move back and forth along the first pipe 11.

After further analyzing the above structure, we found it still has the following problems: once the actuator 10 is used for carrying load, after the screw 13 stops rotating, the self-locking of the actuator 10 depends on the friction among relative components. Hence, the phenomenon that the weight of the load makes the actuator move due to the incapability of self-locking is likely to occur, making the second pipe 12 which previously extended out move back into the first pipe 11 again, and as a result, the actuator 10 will move uncontrollably because of the influence of the load carried, and thus the safe use of the actuator cannot be ensured.

The present invention has arisen to mitigate and/or obviate the afore-described disadvantages.

SUMMARY OF THE INVENTION

The primary object of the present invention is to provide an actuator with self-locking assist device, wherein the friction force between the self-locking assist device and the actuator is used to improve the self-locking capability of the actuator.

To achieve the above object, a self-locking assist device in accordance with the present invention comprises:

an actuator including at least two pipes and a transmission assembly, the one pipe is received in the other pipe, the transmission assembly is disposed in the actuator and dynamically connected with the first and second pipe, in one end of the one of the pipes is defined an adjusting hole; and a self-locking assist device including a stop member, an elastic member and a limit member movably disposed in the adjusting hole of the actuator, respectively, in such a manner that the stop member is abutted against the transmission assembly, the elastic member is pressed against the stop member to generate a friction therebetween, and the stop member is pressed against the elastic member.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
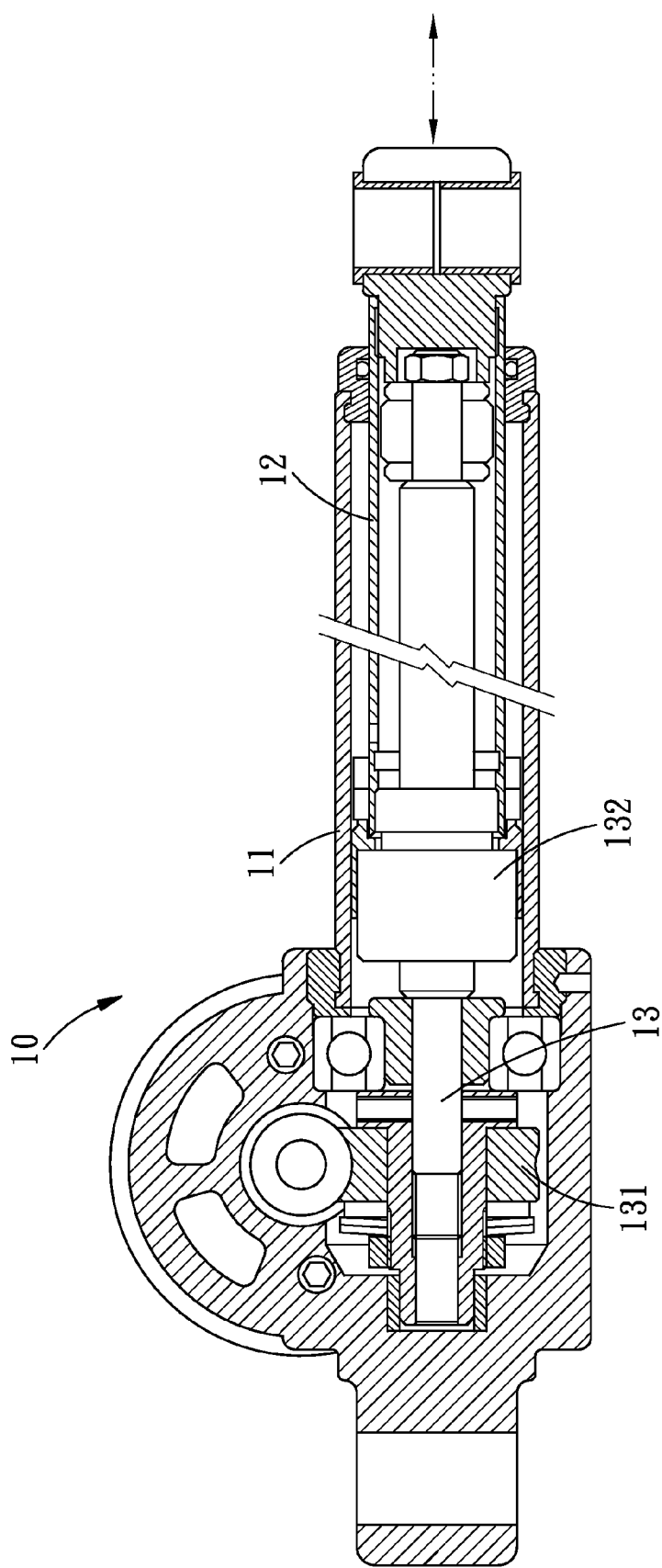
FIG. 1 is an assembly view of a conventional actuator.
Figure 2:
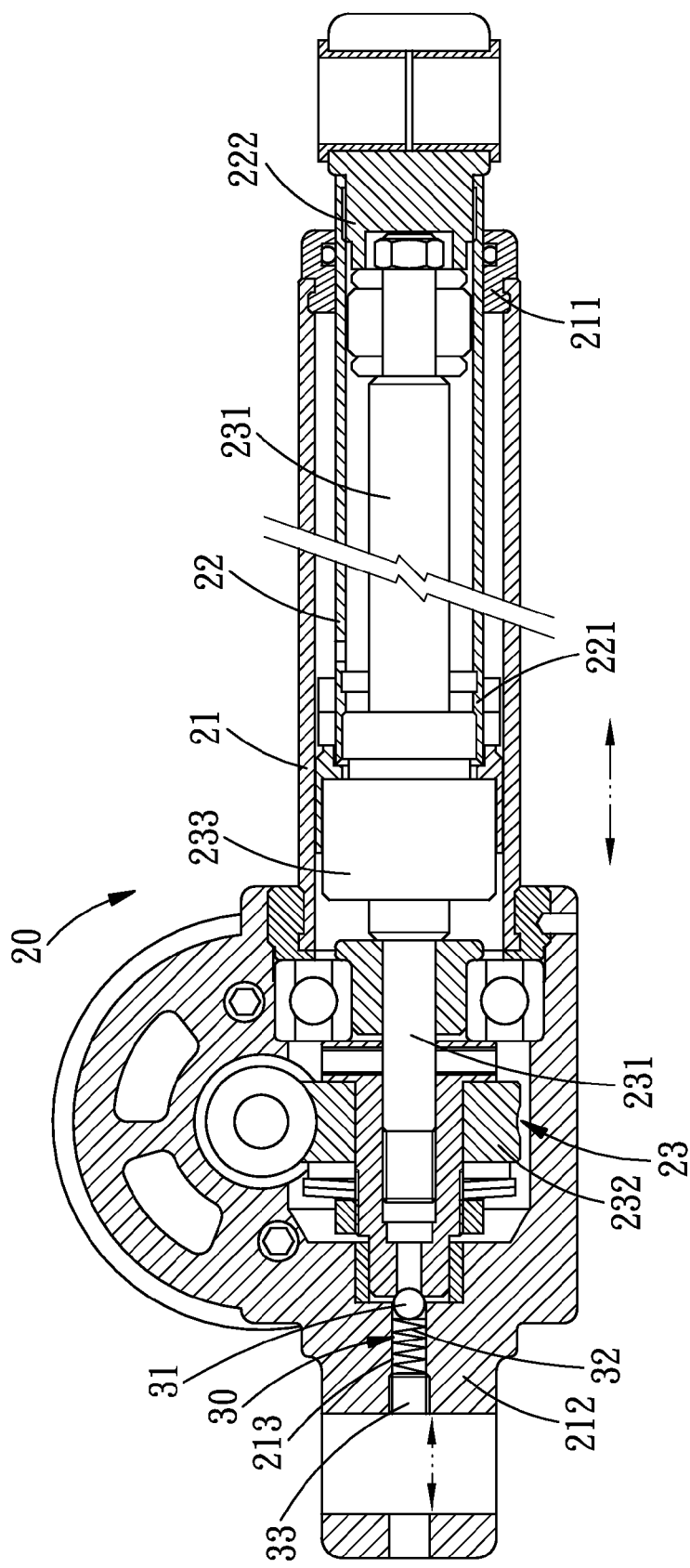
FIG. 2 is a cross sectional view of an actuator with one self-locking assist device.

Referring to FIG. 2, an actuator with self-locking assist device in accordance with a preferred embodiment of the present invention comprises an actuator 20 and a self-locking assist device 30 axially disposed on the actuator 20.

The actuator 20 comprises a first pipe 21, a second pipe 22 and a transmission assembly 23.

The first pipe 21 has an open end 211 and a close end 212, and in the close end 212 of the first pipe 21 is axially formed an adjusting hole 213. The second pipe 22 also has an open end 221 and a close end 222, and in the close end 222 of the second pipe 22 is defined an adjusting hole 223. The second pipe 22 has a cross section smaller than that of the first pipe 21. The open ends 221, 211 of the second and first pipes 22, 21 are oppositely arranged, and the second pipe 22 is movably disposed in the first pipe 22. The assembling direction of the two pipes 21 and 22 correspond to their extension direction.

The transmission assembly 23 comprises a screw 231, a drive gear 232 and a driven nut 233. The screw 231 is axially disposed in the close end 212 of the first pipe 21 of the actuator 20 in such a manner that the lower end of the screw 231 is opposite the adjusting hole 213 of the first pipe 21. The drive gear 232 is mounted on the screw 231 and dynamically connected with the power source. The driven nut 233 is coaxially and dynamically connected with the drive gear 232, and one end of the driven nut 233 is coaxial assembled to the open end 221 of the second pipe 22. When the drive gear 232 drives the screw 231 to rotate, the driven nut 233 will be caused to make the second pipe 22 extend out or retract into the first pipe 21.

Figure 3:
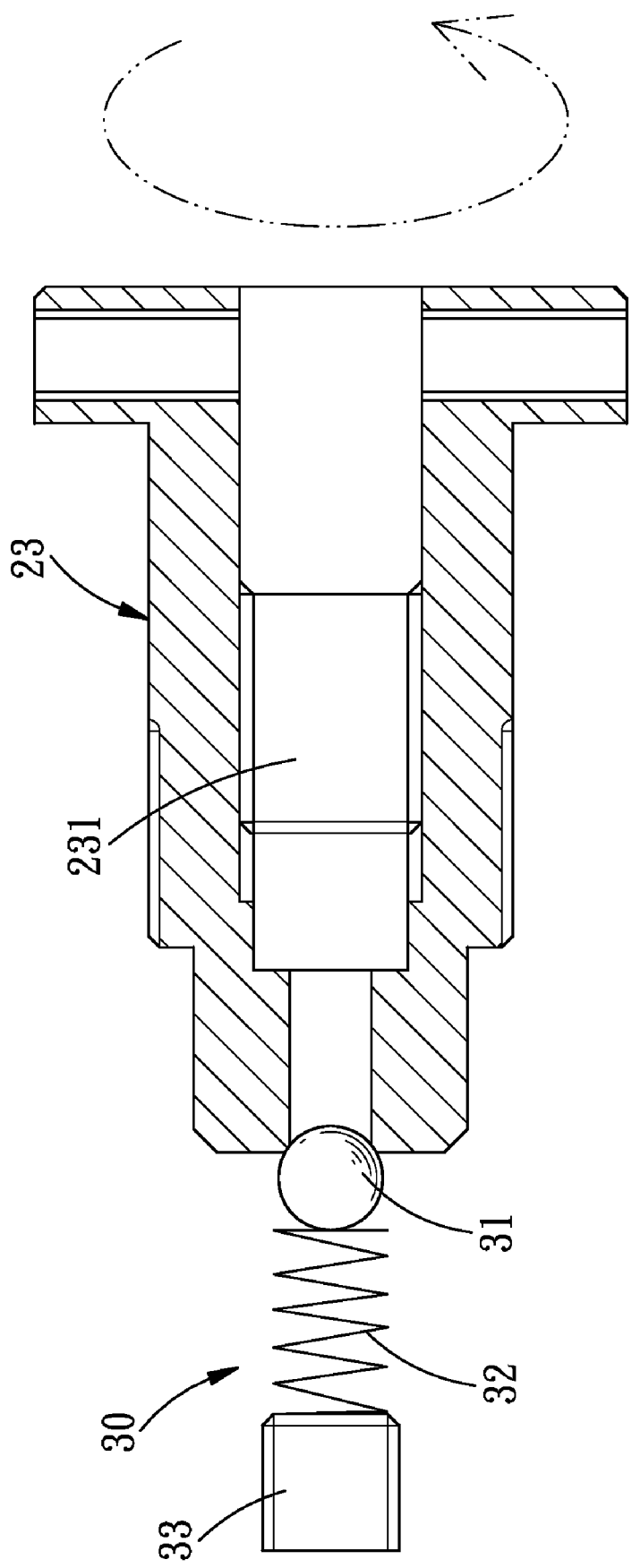
FIG. 3 is an amplified view of a part of FIG. 2.
Figure 4:
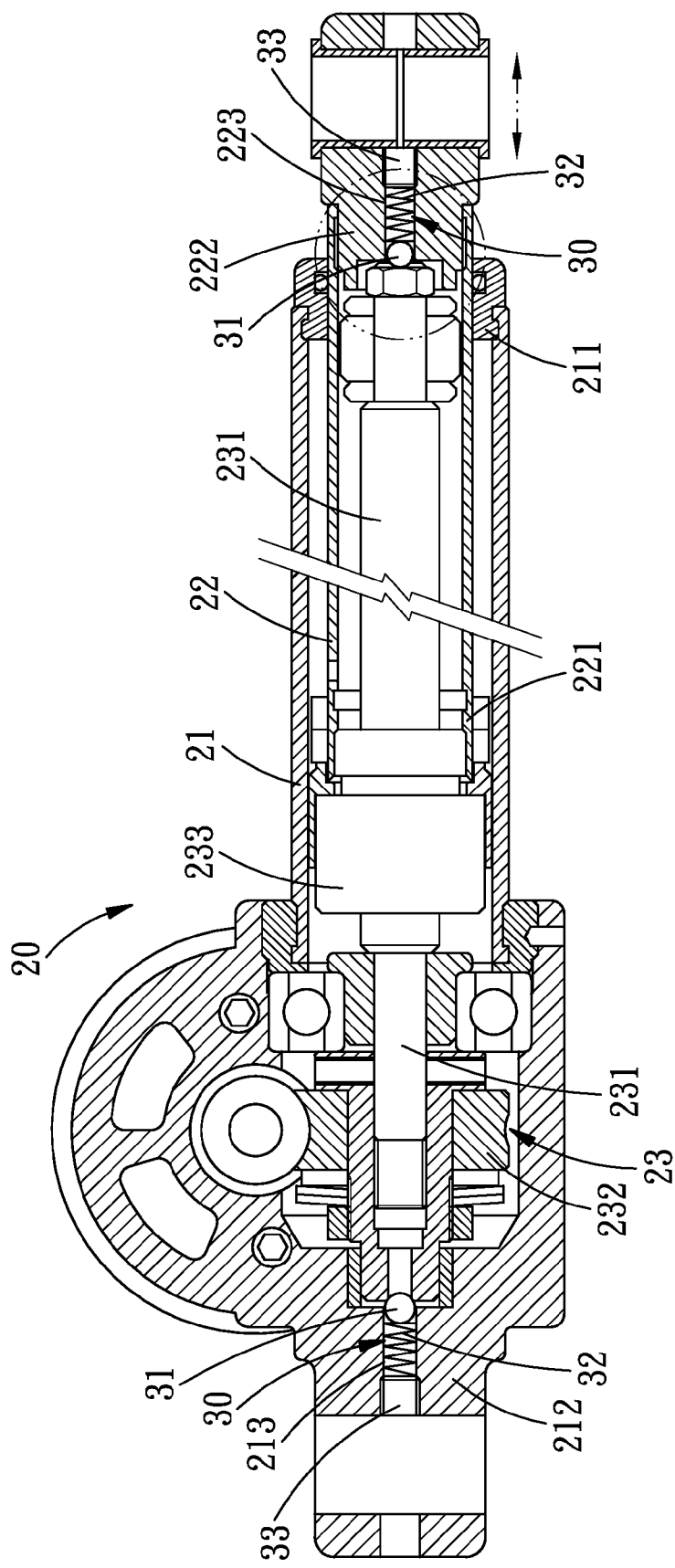
FIG. 4 is a cross sectional view of an actuator with two self-locking assist devices.
Figure 5:
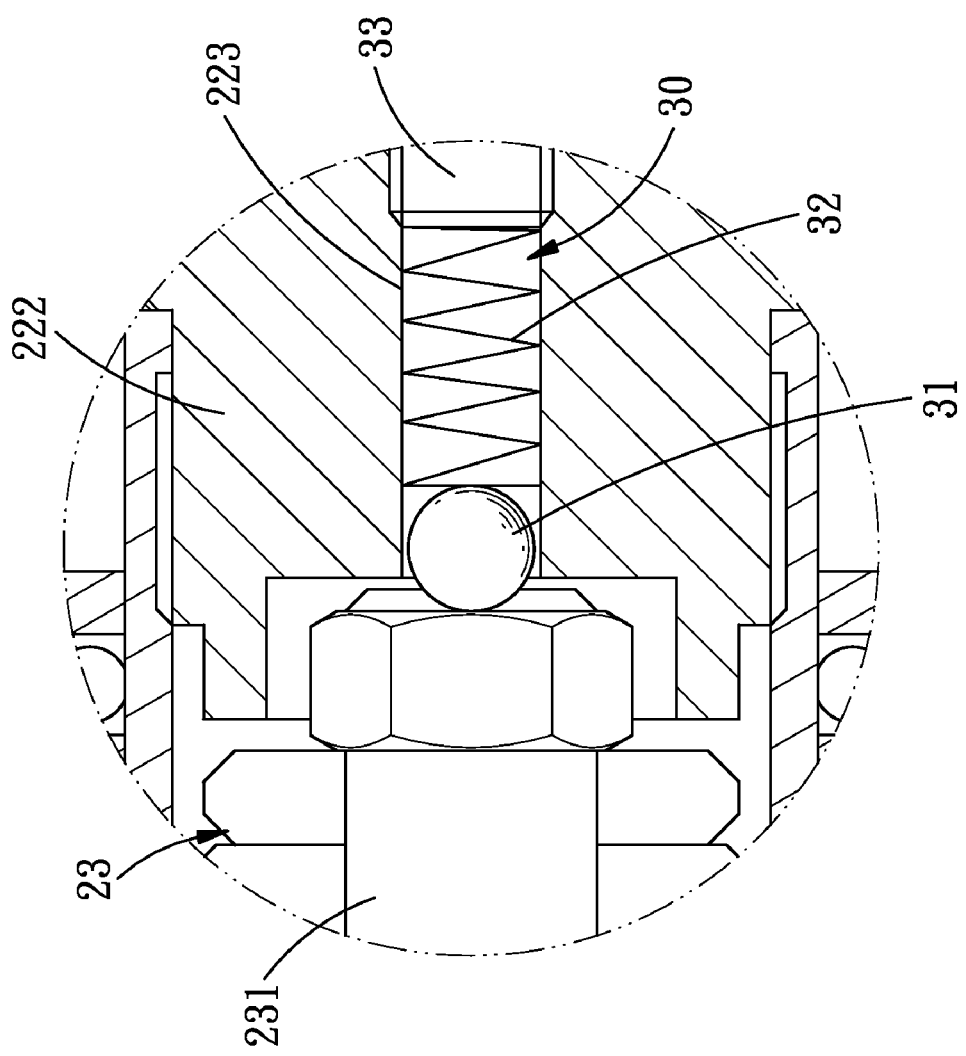
FIG. 5 is an amplified view of a part of FIG. 4.

The self-locking assist device 30, as shown in FIGS. 2 and 3, comprises a stop member 31, an elastic member 32 and a limit member 33. The stop member 31 is a ball, the elastic member 32 is a spring, and the limit member 33 is a bolt, and they are received in the adjusting hole 213 of the first pipe 21, respectively in such a manner that the stop member 31 is abutted against the transmission assembly 23, the elastic member is pressed against the stop member 31, and the stop member 31 is pressed against the elastic member 32 to generate friction therebetween, with the displacement of the limit member 33, the limit member 33 is caused to push the stop member 31 via the elastic member 32, thus adjusting a friction force of the stop member 31 applied to the transmission assembly 23. Or, (as shown in FIGS. 4 and 5), the self-locking assist device 30 comprises two stop members 31, two elastic members 32 and two limit members 33, they can be received in each of the adjusting holes 213, 223 of the first and second pipes 21, 22, respectively, in such a manner that the stop members 31 are frictionally abutted against both ends of the screw 231 of the transmission assembly 23, the threaded portions of the limit members 33 are screwed in the adjusting holes 213 and 223 of the first and second pipes 21, 22, and the elastic members 32 are biased between the stop members 31 and the limit members 33. With the displacement of the limit members 33, the push force of the elastic members 32 applied to the stop members 31 can be adjusted, meanwhile, the push force of the stop members 31 applied on the screw 231 is also adjusted, thus adjusting the friction force between the stop members 31 of the self-locking assist device 30 and the screw 231 of the transmission assembly 23, and the value of the friction force is determined by the amount of compression and elasticity of the elastic members 32.

While we have shown and described various embodiments in accordance with the present invention, it is clear to those skilled in the art that further embodiments may be made without departing from the scope of the present invention.

What is claimed is:

1. An actuator with self-locking assist device, comprising: an actuator including a first pipe, a second pipe and a transmission assembly, the second pipe being received in the first pipe, the transmission assembly being disposed in the actuator and dynamically connected with the first and second pipe, one end of each of the first and second pipe defining an adjusting hole; and a self-locking assist device including a stop member, an elastic member and a limit member movably disposed in each of the adjusting holes at the one end of each of the first and second pipe, respectively, in such a manner that the stop member is abutted against the transmission assembly, the elastic member is pressed against the stop member, and the stop member is pressed against the elastic member, with the displacement of the limit member, the limit member pushes the stop member via the elastic member.

2. The actuator with self-locking assist device as claimed in claim 1, wherein the first pipe has a closed end and an open end, and one adjusting hole of the actuator is defined in the closed end of the first pipe, the second pipe also has an open end and a closed end, the other adjusting hole of the actuator is defined in the closed end of the second pipe, the open ends of the second and first pipes are oppositely arranged, and the second pipe is movably disposed in the first pipe, the transmission assembly comprises a screw, a drive gear and a driven nut, the screw is disposed in the closed ends of the first and second pipe of the actuator in such a manner that both ends of the screw are opposite the adjusting holes of the first and second pipe so that the screw is frictionally abutted against the stop member of the self-locking assist device, the drive gear is mounted on the screw and dynamically connected with a power source, the driven nut is dynamically connected with the drive gear, and one end of the driven nut is coaxially assembled with respect to the open end of the second pipe.

3. The actuator with self-locking assist device as claimed in claim 1, wherein the stop member is a ball, the elastic member is a spring, and the limit member is a bolt.

4. The actuator with self-locking assist device as claimed in claim 1, wherein a threaded portion of the limit member is screwed in the adjusting hole of the second pipe.

* * * * *